(12) United States Patent
Tsien

(10) Patent No.: US 7,406,566 B2
(45) Date of Patent: Jul. 29, 2008

(54) RING INTERCONNECT WITH MULTIPLE COHERENCE NETWORKS

(75) Inventor: Benjamin Tsien, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 321 days.

(21) Appl. No.: 11/145,120

(22) Filed: Jun. 3, 2005

(65) Prior Publication Data

US 2006/0277369 A1    Dec. 7, 2006

(51) Int. Cl.
    G06F 12/00    (2006.01)
    G06F 3/00     (2006.01)
    G06F 13/16    (2006.01)
    G06F 13/42    (2006.01)

(52) U.S. Cl. ............................ 711/119; 711/3; 711/141; 711/143; 711/146; 711/167; 710/11; 710/36; 710/38; 710/100; 709/213; 709/216; 709/218; 709/238; 709/251; 709/245

(58) Field of Classification Search ................. None
    See application file for complete search history.

(56) References Cited

U.S. PATENT DOCUMENTS

| 6,253,292 | B1 * | 6/2001 | Jhang et al. ............... 711/146 |
| 6,611,906 | B1 * | 8/2003 | McAllister et al. ......... 711/168 |
| 6,988,173 | B2 * | 1/2006 | Blake et al. ................ 711/147 |
| 2004/0008721 | A1 * | 1/2004 | Ying et al. ................. 370/460 |

* cited by examiner

*Primary Examiner*—Jack A Lane
(74) *Attorney, Agent, or Firm*—Erik M. Metzger

(57) ABSTRACT

A cache architecture to increase communication throughput and reduce stalls due to coherence protocol dependencies, while reducing power within an integrated circuit. More particularly, embodiments of the invention include a plurality of cache agents that each communication with the same protocol agent, which may or may not be integrated within any one of the cache agents. Embodiments of the invention also include protocol agents capable of storing multiple sets of data from different sets of cache agents within the same clock cycle.

26 Claims, 7 Drawing Sheets

RING INTERCONNECT WITH MULTIPLE COHERENCE NETWORKS

FIELD OF INVENTION

Generally, embodiments of the invention relate to integrated electronics and integrated electronics systems. More specifically, embodiments of the invention relate to a technique and corresponding infrastructure to optimize bandwidth of a caching protocol having at least two networks of caching agents communicating simultaneously with at least two cache protocol agents.

BACKGROUND

Computer systems and processor architectures, in particular, can use various types communication networks and protocols to exchange information between agents, such as electronic devices, within those systems and architectures. In a microprocessor having multiple processing elements ("processing cores"), for example, use caching agents to store, retrieve, and exchange data between the various cores of the microprocessor. Likewise, computer systems in which single or multiple core microprocessors are interconnected may use caching agents to store, retrieve and exchange data between the microprocessors or other agents.

In electronic networks cached data is managed and exchanged according to certain rules, or "protocol", such that coherency is maintained among the various caches and the devices, such as processing cores, that use the cached data. Caching activity across these devices directly serviced by the caches, such as lookups, stores, invalidations, and data transfer, can be managed by logic or software routine (collectively or individually referred to as a "cache agent"), such that cache coherency is maintained among the various caches and cache agents. Caching activity within or outside of a microprocessor, such as snoop resolution, write-backs, fills, requests, and conflict resolution, can be managed by logic or software routine (collectively or individually referred to as a "protocol agent"), such that coherency is maintained among the various cache agents and processing cores within the microprocessor and among agents external to the microprocessor. In some prior art multi-core of single-core processors, for example, the caching agent is coupled to a specific coherence protocol agent, which may be physically integrated within the caching agent to which it corresponds. This means that the same circuit and/or software routine may be responsible for implementing cache operations, such as requests, dirty block replacement, fills, reads, etc., as the protocol for managing these operations.

FIG. 1 illustrates a prior art microprocessor having a number of caching agents, each having circuitry to implement the caching protocol used among the caching agents of the microprocessor. In the prior art processor of FIG. 1, each caching agent is responsible for implementing and keeping track of the cache protocol as applied to itself. Unfortunately, this "decentralized" caching protocol architecture requires redundant use of protocol logic and/or software to maintain the caching protocol among all caching agents within the processor or computer system to which the protocol corresponds. In the case of the protocol being implemented using complementary metal-oxide-semiconductor (CMOS) logic devices, this can result in substantial power consumption by the processor or system, especially in multi-core processors having a number of caching agents.

Furthermore, the prior art caching architecture of FIG. 1 may be somewhat bandwidth limited in the amount of caching traffic supported among the caching agents, as each caching agent has to share the same bus, cache agent ports, and cache agent queuing structure that facilitate communication among the various caching agents.

BRIEF DESCRIPTION OF THE DRAWINGS

Claimed subject matter is particularly and distinctly pointed out in the concluding portion of the specification. The claimed subject matter, however, both as to organization and method of operation, together with objects, features, and advantages thereof, may best be understood by reference to the following detailed description when read with the accompanying drawings in which:

DETAILED DESCRIPTION

Embodiments of the invention disclosed herein describe a caching architecture that may be used in an electronic device, such as a single core or multiple core microprocessor, or an electronics system, such a shared bus computer system or a point-to-point (P2P) bus computer system. More particularly, one embodiment of the invention describes a caching architecture, in which the caching protocol is more centralized and decoupled from the caching agents to which the protocol corresponds than in some prior art caching architectures. Advantageously, at least one embodiment of the invention helps to reduce power consumption and increase caching bandwidth and throughput within the electronic device or electronics system in which the embodiment is implemented, in relation to some prior art caching architectures.

In one embodiment of the invention a cache agent can communicate with a protocol agent using two signals: one signal ("AD") to communicate addressed caching operations, such as data and/or cache ownership requests, data write-back operations, and snoop responses with data for cache-to-cache transfers, from a cache agent, and one signal ("AK") to communicate non-address responses, such as cache fill acknowledgements and non-data snoop responses, such as a cache "hit" or "miss" indication. Furthermore, in at least one embodiment, each signal may transmit information in opposite directions within the same clock cycle. For example, AK may transmit a first operation, such as a request operation, to a first protocol agent during a first clock cycle in a first direction while transmitting a second operation, such as a write-back operation, to the first or a second protocol agent in the opposite direction during the same clock signal.

Figure 1:
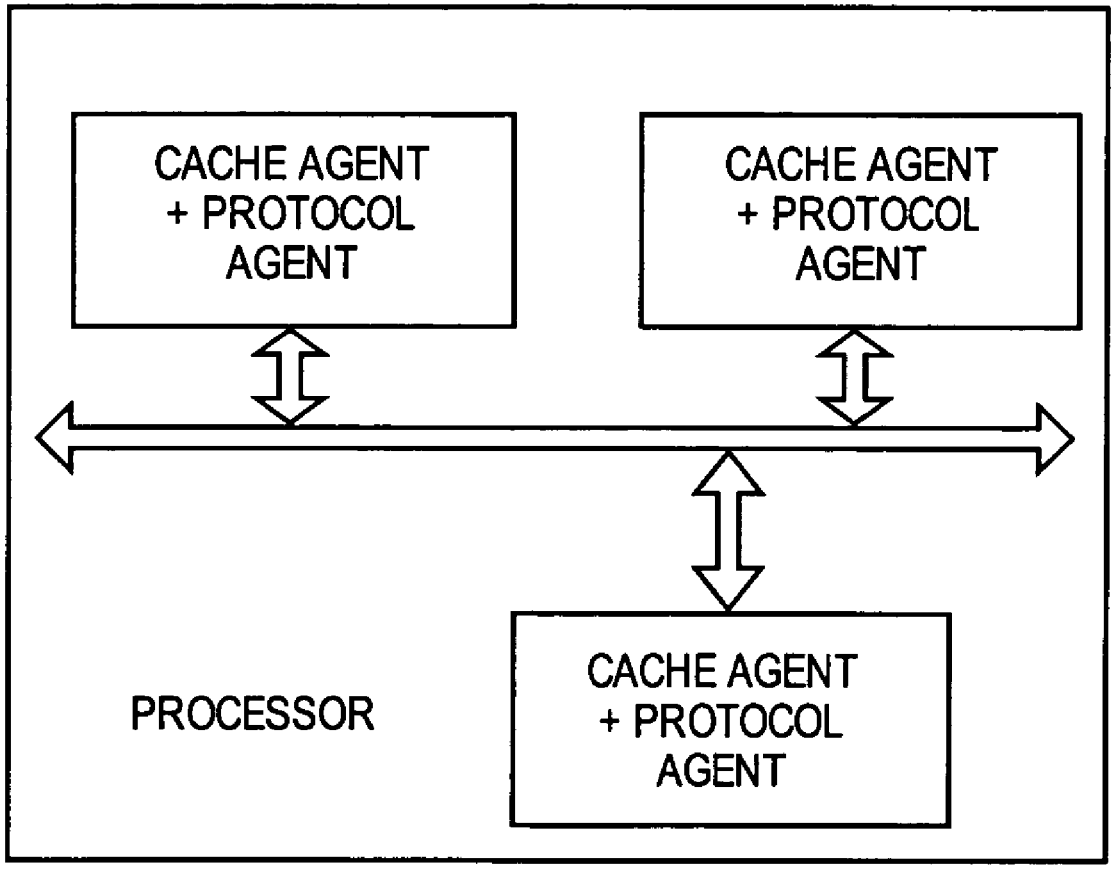
FIG. 1 illustrates a prior art caching architecture used within a microprocessor or computer system.
Figure 2:
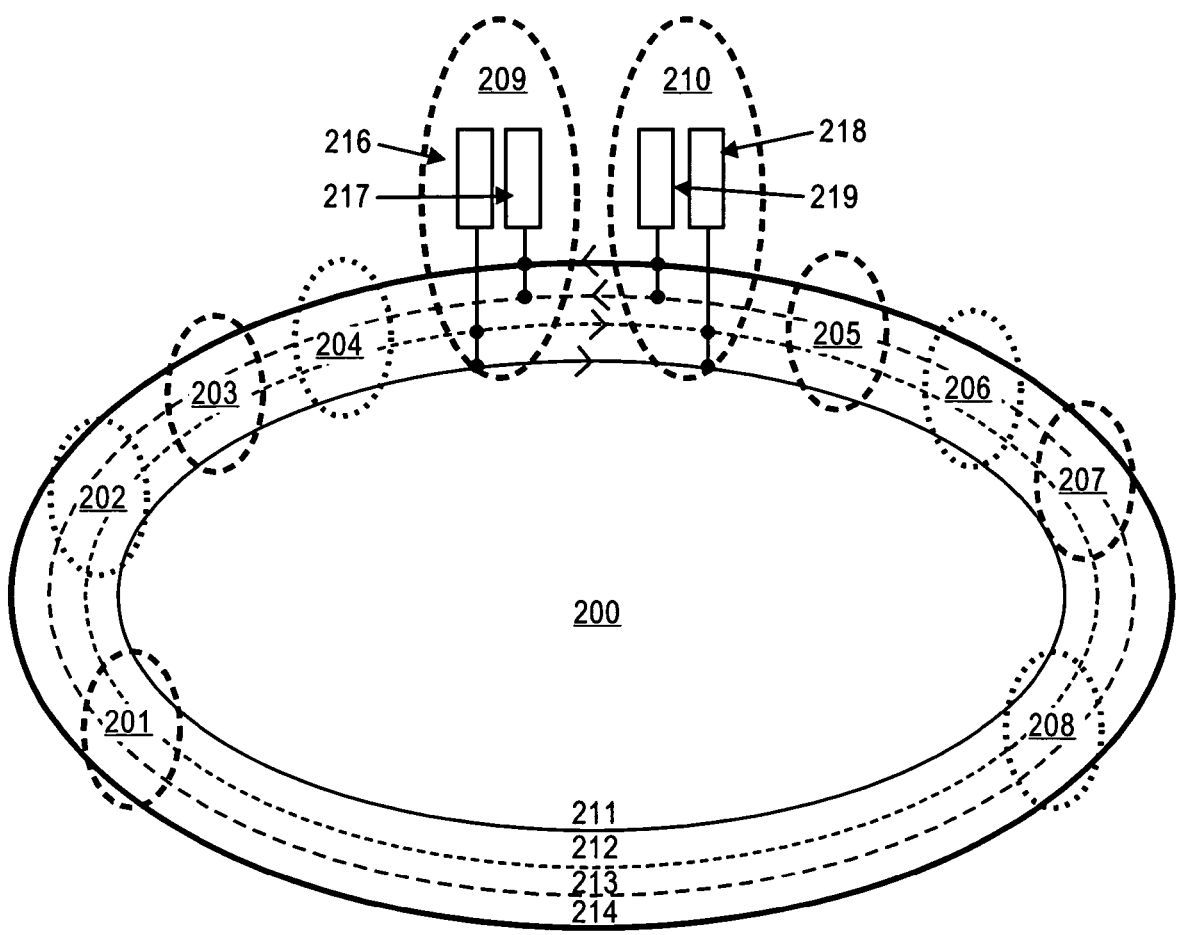
FIG. 2 illustrates a caching architecture according to one embodiment of the invention.

The concurrent bidirectional characteristics of the signals, AD and AK, can be conceptualized by two sets of cache agents, routing circuits, and a protocol agent interconnected by two signals, or "rings", transmitting an AK and AD signal, respectively, in one direction. FIG. 2, for example, illustrates a caching architecture according to one embodiment of the invention, in which the two signals, AD and AK, are conceptualized as four rings, two of which are capable of transmitting information in a clockwise direction and two of which are capable of transmitting information in a counter clockwise direction during an odd and even clock cycle. In particular, the caching architecture 200 of FIG. 2 depicts a first set of caching agents 201, 203, 205, and 207 that correspond to a first caching protocol agent ("protocol agent") 209 and a second set of caching agents 202, 204, 206, and 208 that correspond to a second protocol agent 210.

Each cache agent of the first set can communicate cache operations such as loads and stores to processing cores (not shown in FIG. 2), and data requests, data write-back operations, cache fill acknowledgements, and snoop response transactions, to the first protocol agent. Likewise, each cache agent of the second set communicates these non-data cache transactions to the second protocol agent. The cache agents may communicate to the protocol agents, in one embodiment, through a series of router circuit (not shown in FIG. 2).

The first and second protocol agents are responsible for arbitrating between the various operations from their respective cache agents such that the operations are managed and completed in a manner consistent with the caching protocol of the caching architecture.

In one embodiment of the invention, each cache agent has access to four communication channels (depicted by rings in FIG. 2) 211, 212, 213, 214, upon which caching transactions may be communicated. Each cache agent may communicate cache transactions on any of the four rings illustrated in FIG. 2 in one embodiment of the invention. In other embodiments, each cache agent may be restricted to a particular ring or group of rings upon which caching transactions may be communicated to/from the cache agent. The cache data that results from the transactions communicated on the rings of FIG. 2 may be communicated among the cache agents on other communication channels (e.g. data bus) not depicted in FIG. 2. Alternatively, in some embodiments the cache data may be communicated on the rings depicted in FIG. 2. Moreover, in other embodiments, each network in FIG. 2 may be configured in other topologies, such as tree topology or a chain.

In the embodiment illustrated in FIG. 2, caching transactions, such as data and/or cache ownership requests, data write-back operations, and snoop responses with data are sent on rings 212 and 214 ("address" rings) and transactions, such as cache fill acknowledgements and non-data snoop responses, such as a cache "hit" or "miss" indication, are transmitted on rings 211 and 213 ("non-address" rings). In other embodiments the above or other transactional information may be transmitted on other combinations of the rings 211-214. The particular ring assignment for the various cache transactions discussed above and illustrated in FIG. 2 are only one example of the transactions and ring assignments that may be used in embodiments of the invention.

As each set of cache agents communicates information between each other via the protocol agents, an ordering of the information entering the protocol agent can be maintained, in at least one embodiment, such that the correct information will allow correct coherence protocol transitions in the protocol agent at the right time. In one embodiment of the invention, ordering of information within the networks is maintained by each protocol agent. More specifically, in one embodiment of the invention, the ordering of information can be maintained by recording the order of arriving information into a protocol agent, such that the sequence of information is maintained as the information is used to produce correct coherence transitions in the system.

In one embodiment of the invention, each protocol agent contains a number of buffers that may be used to store data, commands, or addresses originating from one of the cache agents, which can then be retrieved from the buffers in the proper order to be delivered to a particular cache agent. In the embodiment of the invention illustrated in FIG. 2, each protocol agent includes, or otherwise has associated therewith, two first-in-first-out (FIFO) buffers 216, 217, 218, 219 that are each coupled to two of the four rings of FIG. 2. Each pair of rings illustrated can communicate information in a particular direction. For example, rings 211 and 212 can communicate information in a clockwise (CW) direction, whereas rings 213 and 214 can communicate information in a counter-clockwise (CCW) direction.

By allowing information to be communicated in two directions in the caching architecture of FIG. 2, information among cache agents within the two networks may be communicated concurrently, such as within the same bus clock cycle. For example, in one embodiment, information may be transmitted on ring 211 in the same clock cycle, but in the opposite direction, as information transmitted on ring 214. Similarly, in one embodiment, information may be transmitted on ring 212 in the same clock cycle, but in the opposite direction, as information transmitted on ring 214. In one embodiment, there may be restrictions on message arrival at the protocol agent for each ring, such that protocol agent 209 may not receive a message from 212 and 214 ("address" rings) during the same cycle. Similarly, 210 may not receive a message from 211 and 213 ("non address" rings) during the same cycle.

The following table summarizes the transmission concurrency rules of FIG. 2 according to one embodiment of the invention:

| Transaction/Direction | To Protocol Agent 209 | To Protocol Agent 210 |
|---|---|---|
| AK/CW | Even Clock Cycles | Even Clock Cycles |
| AD/CW | Odd Clock Cycles | Odd Clock Cycles |
| AK/CCW | Odd Clock Cycles | Odd Clock Cycles |
| AD/CCW | Even Clock Cycles | Even Clock Cycles |

The particular choice of even or odd numbered clock cycles in which to send a particular transaction illustrated in the table above is somewhat arbitrary and may be different in different embodiments. For example, instead of an AK/CW transaction being sent on an even cycle, it may be sent on an odd cycle and the AK/CCW may be sent on an even clock cycle rather than an even one. Embodiments of the inventions generally enable two transactions of differing types (AD versus AK) to be transmitted concurrently in different directions to either protocol agent.

Because the protocol agents are positioned an integer multiple of clock cycles ("hops") apart from each other, a transaction that is to be received by a particular protocol agent by first passing through the other protocol agent will necessarily pass through the other protocol agent on the opposite clock cycle from the cycle in which it will be received by the target protocol agent. This relationship may be maintained as long as the protocol agents are positioned an even number of hops apart.

Each protocol agent in FIG. 2 contains two FIFO buffers, in one embodiment of the invention, to store information transmitted on AD and AK traveling in a particular direction, such as clockwise. In one embodiment, each protocol agent maintains the correct ordering of the various caching operations being performed by temporarily storing the operations as they arrive within each protocol agent and retrieving them in the order in which they arrived in order to produce correct coherence protocol transitions in the protocol agent. For example, in one embodiment, protocol agents 209 and 210 store information transmitted in the counter-clockwise direction on rings, AD and AK, in FIFOs 216 and 218, whereas protocol agents 209 and 210 store information transmitted in the clockwise direction on rings, AD and AK, in FIFOs 217 and 219, respectively.

Figure 3:
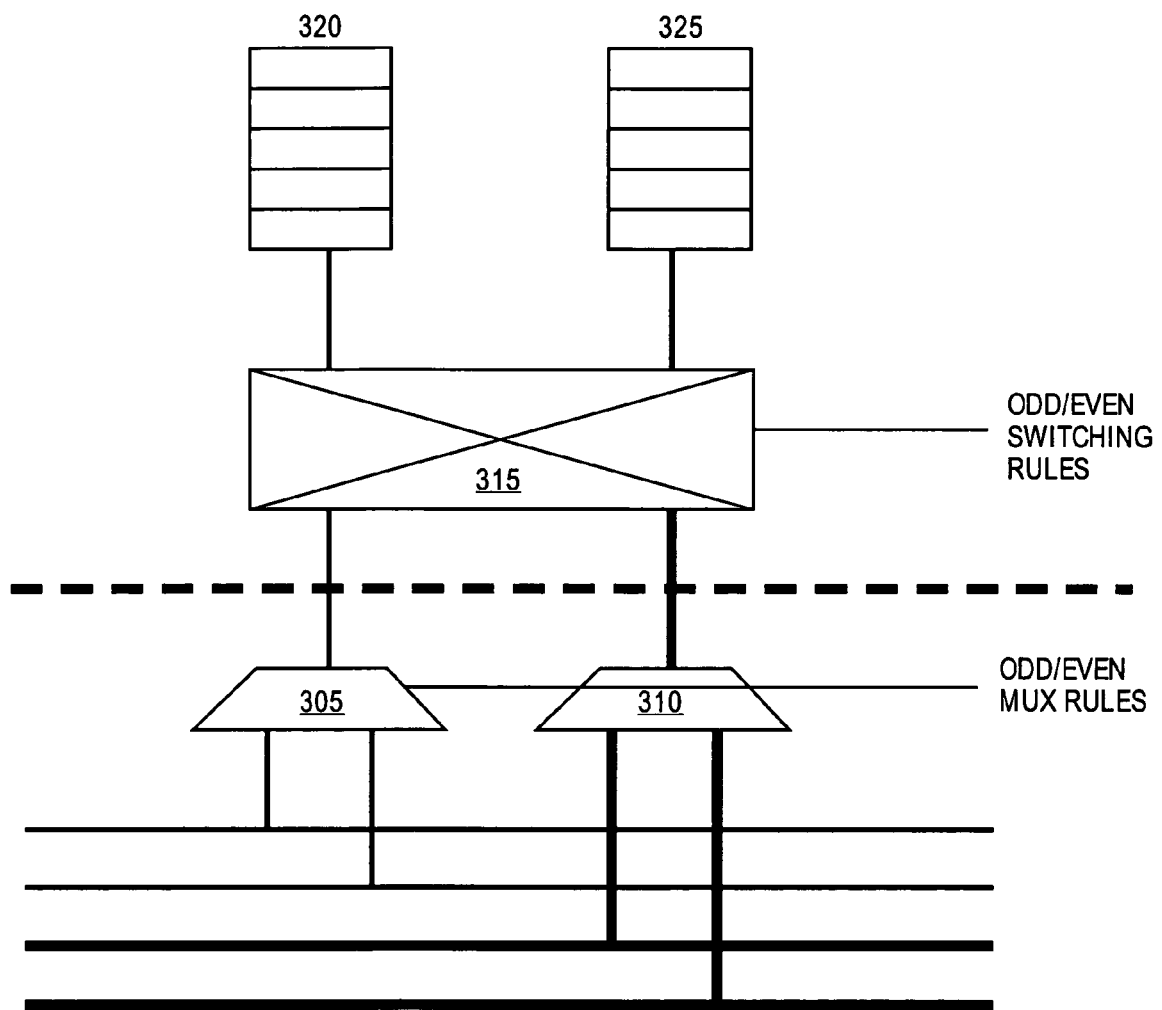
FIG. 3 illustrates an interconnection between a cache agent ring and a protocol agent, according to one embodiment of the invention.

FIG. 3 illustrates an interface between the rings and FIFOs within the protocol agents of FIG. 2. FIG. 3 is a conceptualization of an interface that may exist in one embodiment, in which there are two sets of cache agents, router circuits, and protocol agents. FIG. 3 shows two sets of two rings, and through message arrival restrictions, each set of two rings is able to be time-multiplexed into a single merged interconnect, Similar to FIG. 2, FIG. 3 is an illustration of two sets of two rings, each being able to transmit information in one direction. The specific implementation of the interface between the cache agents and protocol agents may change in different embodiments, so the particular embodiment conceptualized in FIG. 3 should not be narrowly construed to be the specific hardware implementation of the embodiment.

In the embodiment conceptualized in FIG. 3, each signal, CW AD and CCW AD, for a set of cache agents enters a MUX 305. Likewise CW AK and CCW AK enter into a MUX 310. Selection rules, which may be implemented in hardware logic, software, or some combination thereof, dictate which signal from each MUX to propagate to FIFO interface logic 315. For example, in one embodiment, the selection rules for the MUX 305 may pass CW AD on an even numbered clock cycle and MUX 310 may pass CCW AK on an even numbered clock cycle. Alternatively, MUXes 305 and 310 may pass CCW AD and CW AK, respectively, on an odd numbered clock cycle in other embodiments.

The FIFO to which MUXed AD and AK will be stored during an even or odd numbered clock cycle is determined by the FIFO interface logic 320, in one embodiment of the invention. FIFO interface logic may implement, or at least use, switching rules implemented in hardware logic, software or some combination thereof, to determine to which FIFO 320 and 325 the information contained within signals, AD and AK, should be stored. In one embodiment, the FIFO interface logic stores information contained within signal, AD, to FIFO 320 and information contained within signal, AK, to FIFO 325 during each even numbered clock cycle, and AD and AK to FIFO 325 and 320 during each odd numbered clock cycle.

Figure 4:
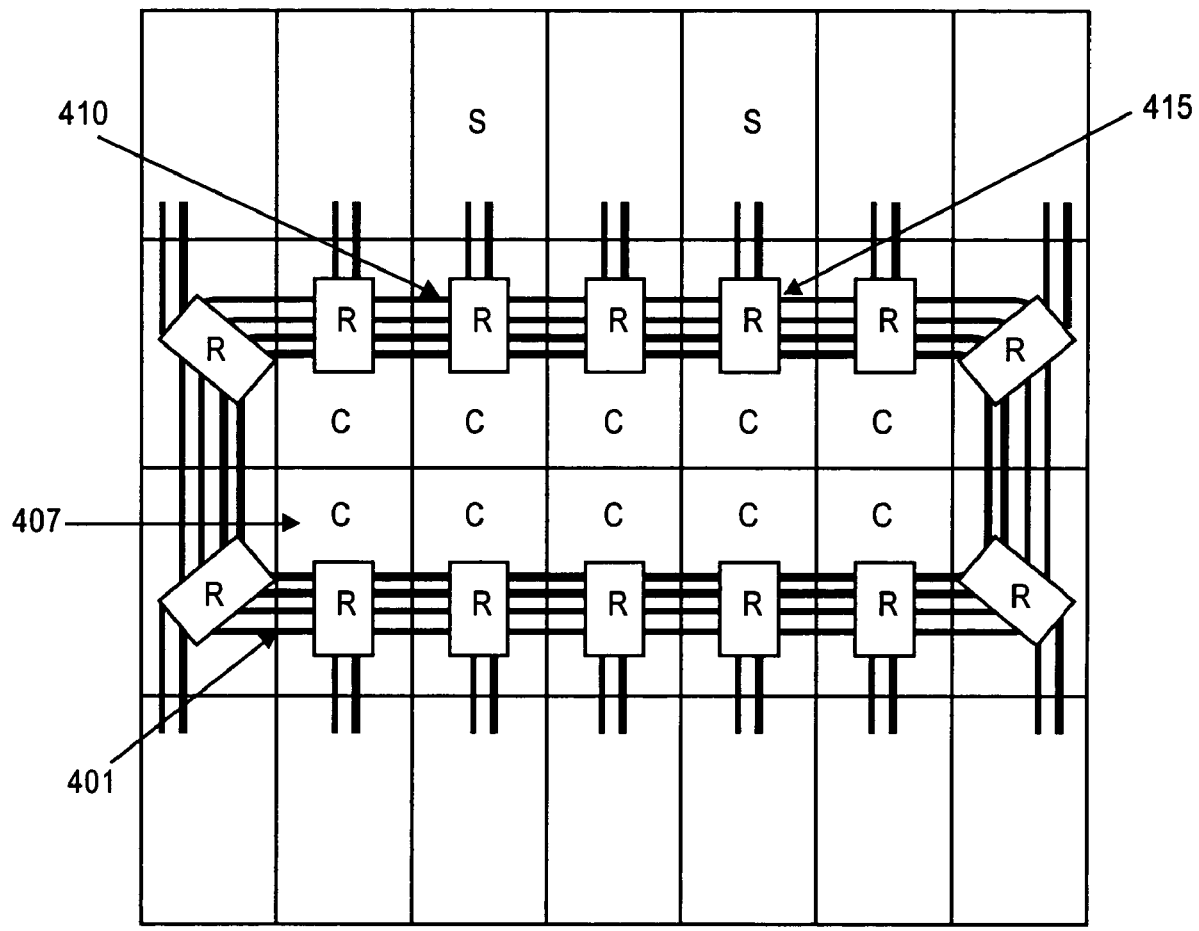
FIG. 4 illustrates a caching architecture including routing circuits according to one embodiment of the invention.

In one embodiment the MUXes 305 and 310, as well as the MUX selection rules are implemented within a routing circuit associated with each cache agent. FIG. 4 is a diagram illustrating the ring structure of FIG. 2 in conjunction with various routing circuits, which route data to their intended recipient from each of the cache agents. In particular, FIG. 4 illustrates a number of cache agents, identified by the letter "C", in a ring configuration of two networks, each comprising signals AD and AK to interconnect a cache agent with a protocol agent, identified by the letter "S". A routing circuit, identified by the letter "R", is associated with each cache agent to either route information contained within signals, AD and AK, to the next cache agent within a network (if the next agent in the network is not a protocol agent) or to a protocol agent (if the next agent within the network is a protocol agent).

Two of the routing circuits 410 and 415 couple the rings of the networks in FIG. 4 to the protocol agents, whereas other routing agents connect the rings to other cache agents and other ring networks. In one embodiment, a cache agent 407 may send a signal intended for one of the protocol agents on ring 401 in a clockwise direction. The routing agents between cache agent 407 and the intended protocol agent, moving in a clockwise direction around the ring, would propagate the information contained within the signal between them until the signal reaches the routing circuit, 410 or 415, which would route the signal to the intended to protocol agent according to the selection rules discussed in reference to FIG. 3. For example, the signal described above, would be retrieved by protocol agent 407 and the information within would be stored in the appropriate FIFO.

After information is stored within the FIFOs of a particular protocol agent, the protocol agent may process the cache events sent by the cache agent in accordance to the coherence protocol by retrieving, or "popping", the information off of the FIFO in the order in which it was stored. By using two FIFOs in the protocol agents, or alternatively, one FIFO partitioned into two FIFOs, information from two different signals, AD and AK, may be stored within a protocol agent during the same clock cycle, thereby improving throughput of the network over some prior art caching architectures. Additional performance is also gained because by breaking the ordered stream of cache event into two FIFOs of two independent streams, the design is better able to handle the protocol dependencies that could cause a single FIFO to block. Having two allows the other FIFO to progress when one is blocked. Also, having two FIFOs that receive two messages a cycle allows a simpler design than one FIFO that receives two messages each cycle. Furthermore, because embodiments of the invention use a relatively few number of protocol agents in a centralized manner (e.g., one protocol agent per cache agent set), rather than associating a different protocol agent with each cache agent in a distributed manner, the number of protocol agents is reduced, thereby reducing power consumption within an integrated circuit comprising various embodiments of the invention.

Figure 5:
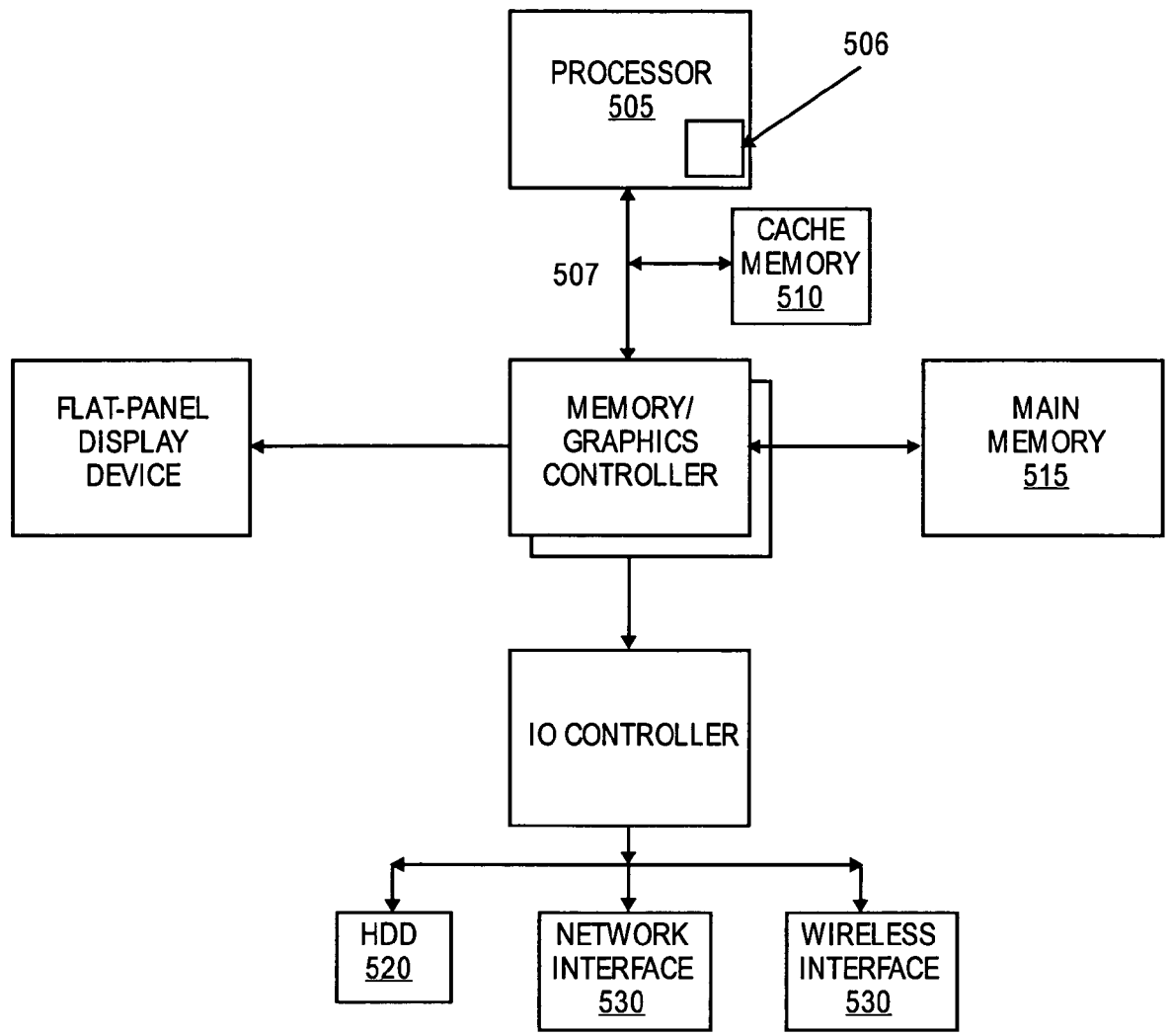
FIG. 5 illustrates a computer system having a shared bus architecture, in which one embodiment of the invention may be used.

FIG. 5 illustrates a front-side-bus (FSB) computer system in which one embodiment of the invention may be used. A processor 505 accesses data from a level one (L1) cache memory 510 and main memory 515. In other embodiments of the invention, the cache memory may be a level two (L2) cache or other memory within a computer system memory hierarchy. Furthermore, in some embodiments, the computer system of FIG. 5 may contain both a L1 cache and an L2 cache.

Illustrated within the processor of FIG. 5 is one embodiment of the invention 506. The processor may have any number of processing cores. Other embodiments of the invention, however, may be implemented within other devices within the system, such as a separate bus agent, or distributed throughout the system in hardware, software, or some combination thereof.

The main memory may be implemented in various memory sources, such as dynamic random-access memory (DRAM), a hard disk drive (HDD) 520, or a memory source located remotely from the computer system via network interface 530 containing various storage devices and technologies. The cache memory may be located either within the processor or in close proximity to the processor, such as on the processor's local bus 507.

Furthermore, the cache memory may contain relatively fast memory cells, such as a six-transistor (6T) cell, or other memory cell of approximately equal or faster access speed. The computer system of FIG. 5 may be a point-to-point (PtP) network of bus agents, such as microprocessors, that communicate via bus signals dedicated to each agent on the PtP network. Within, or at least associated with, each bus agent may be at least one embodiment of invention 506, Alternatively, an embodiment of the invention may be located or associated with only one of the bus agents of FIG. 5, or in fewer than all of the bus agents of FIG. 5.

Figure 6:
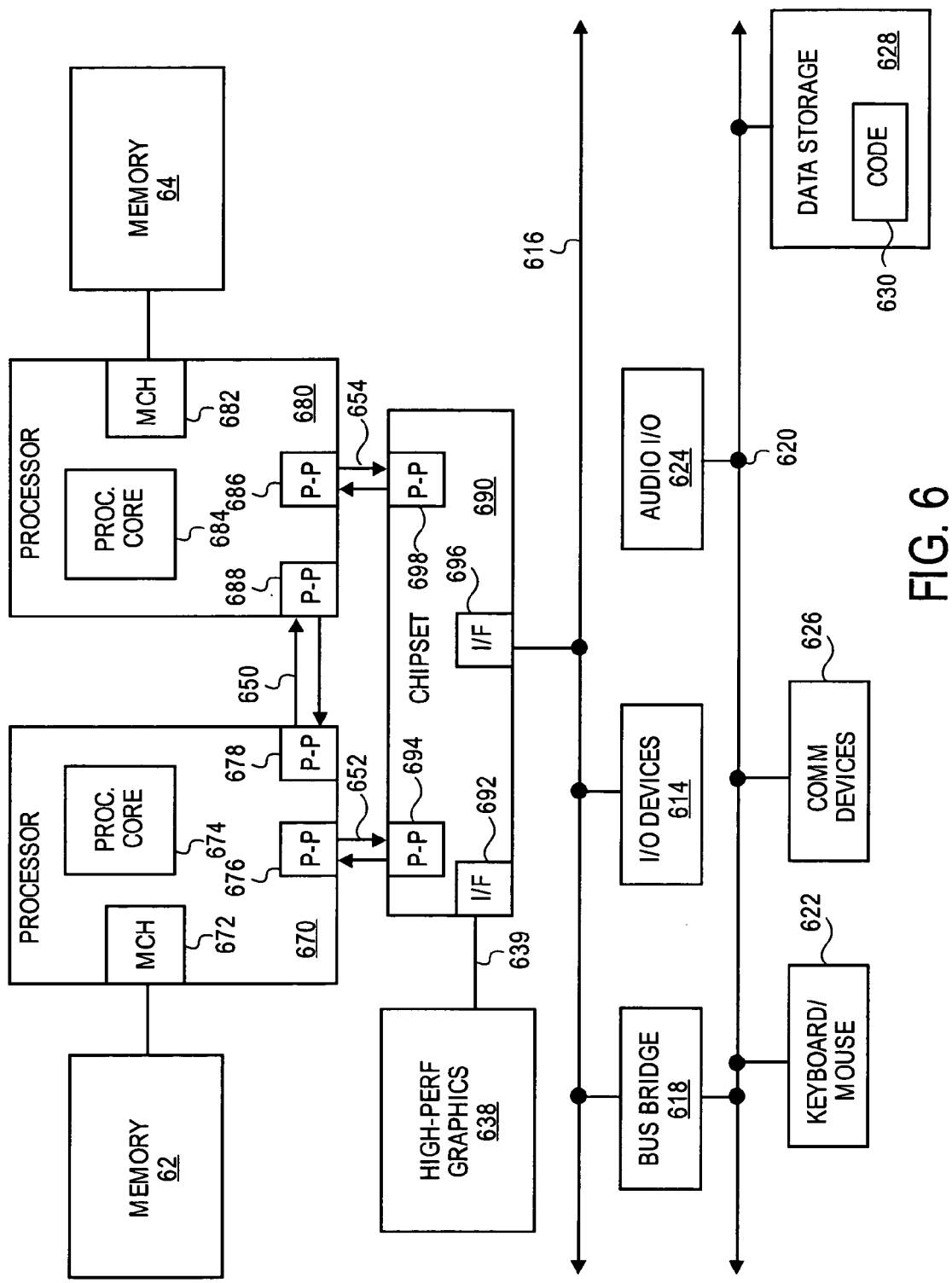
FIG. 6 illustrates a computer system having a point-to-point bus architecture, in which one embodiment of the invention may be used.

FIG. 6 illustrates a computer system that is arranged in a point-to-point (PtP) configuration. In particular, FIG. 6 shows a system where processors, memory, and input/output devices are interconnected by a number of point-to-point interfaces.

The system of FIG. 6 may also include several processors, of which only two, processors 670, 680 are shown for clarity. Processors 670, 680 may each include a local memory controller hub (MCH) 672, 682 to connect with memory 22, 24. Processors 670, 680 may exchange data via a point-to-point (PtP) interface 650 using PtP interface circuits 678, 688. Processors 670, 680 may each exchange data with a chipset 690 via individual PtP interfaces 652, 654 using point to point interface circuits 676, 694, 686, 698. Chipset 690 may also exchange data with a high-performance graphics circuit 638 via a high-performance graphics interface 639. Embodiments of the invention may be located within any processor having any number of processing cores, or within each of the PtP bus agents of FIG. 6.

Other embodiments of the invention, however, may exist in other circuits, logic units, or devices within the system of FIG. 6. Furthermore, in other embodiments of the invention may be distributed throughout several circuits, logic units, or devices illustrated in FIG. 6.

Figure 7:
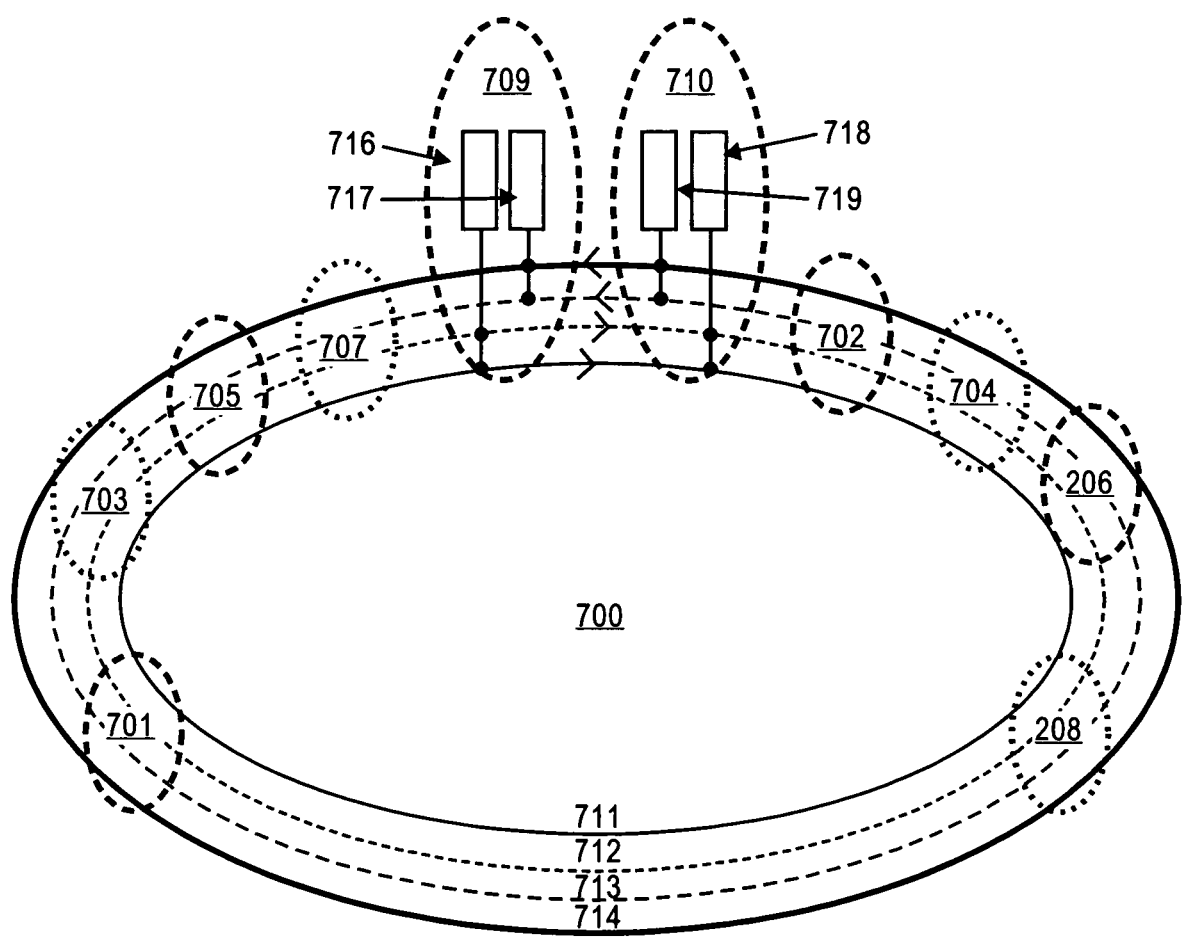
FIG. 7 illustrates a cache architecture according to an alternative embodiment of the invention.

FIG. 7 illustrates a ring network of cache agents according to an alternative embodiment of the invention. Like the network illustrated in FIG. 2, the network of FIG. 7 includes four conceptual rings (realized via two interconnects) 711-714. However, unlike the network illustrated in FIG. 2, FIG. 7 illustrates an arrangement of cache agents 701 703 705 and 707 that are arranged on the same side of ring network 700 as the protocol agent 709 to which they correspond. Similarly, cache agents 702 704 706 and 708 are arranged on the same side of ring network 700 as the protocol agent 710 to which they correspond. With the cache agents in the configuration illustrated in FIG. 7, no information transmitted from a cache agent to its corresponding protocol agent should have to pass through another protocol agent first, thereby improving the performance of the network. Likewise, the configuration illustrated in FIG. 7 eliminates the need for information transmitted from a protocol agent to first pass through another protocol agent before reaching the intended cache agent.

Each protocol agent in FIG. 7 contains two FIFO buffers 716-719, which correspond to the cache agents located on the same side of the ring network as the protocol agents in which they are contained. Each cache agent may then communicate cache operations and receive cache agent responses (via AD and AK signals, respectively) on every other clock cycle. The following table summarizes the transmission concurrency rules of FIG. 7 according to one embodiment of the invention:

| Transaction/Direction | To Protocol Agent 709 | To Protocol Agent 710 |
|---|---|---|
| AK | Even Clock Cycles | Even Clock Cycles |
| AD | Odd Clock Cycles | Odd Clock Cycles |

The embodiment illustrated in FIG. 7 is designed to accommodate a bulk of cases in which a cache agent within one set (located on one side of the ring) will communicate with only the protocol agent within the same set. Other configurations and cache agent arrangements besides those illustrated in FIGS. 2 and 7 may be used in other embodiments of the invention to optimize performance and/or power for other usage models.

In the following detailed description, numerous specific details are set forth in order to provide a thorough understanding of the claimed subject matter. However, it will be understood by those skilled in the art that the claimed subject matter may be practiced without these specific details. In other instances, well-known methods, procedures, components and circuits have not been described in detail so as not to obscure the claimed subject matter.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. An apparatus comprising:
   a first cache agent;
   a second cache agent coupled to the first cache agent;
   a concentric ring interconnect coupled to the first and second cache agents including a first and second signal;
   a first protocol agent to receive a first cache operation information from the first cache agent in the first signal and a second cache operation information from the second cache a gent in the second signal during the same clock cycle, wherein the first cache operation information includes snoop data, write-back information, and data request commands and the second cache operation information includes fill acknowledge information and non-data snoop response information.

2. The apparatus of claim 1 wherein the first protocol agent comprises a first-in-first-out (FIFO) buffer to store the first cache operation information and a FIFO buffer to store a second cache operation information.

3. The apparatus of claim 2 wherein the FIFO buffer to store the first cache operation information is to store the first cache operation information during an even numbered clock cycle and the FIFO buffer to store the second cache operation information is to store the second cache operation information during an odd numbered clock cycle.

4. The apparatus of claim 3 wherein the FIFO buffer to store the first cache operation information and the FIFO to store the second cache operation information are separate and distinct FIFO buffer circuits.

5. The apparatus of claim 3 wherein the FIFO buffer to store the first cache operation information and the FIFO to store the second cache operation information are the same FIFO buffer circuit.

6. The apparatus of claim 1 further comprising a second protocol agent to receive a third cache operation information from a third cache agent and to receive a fourth cache operation information from a fourth cache agent during the same clock cycle.

7. The apparatus of claim 6 wherein the first protocol agent and the second protocol agent are coupled by an interconnect and are an even number of hops apart.

8. The apparatus of claim 7 wherein the interconnect comprises two communication paths through which the first cache operation information and a fifth cache operation information 2 nation from a different cache agent are to propagate during the same clock cycle in opposite directions.

9. A system comprising:
a microprocessor comprising a first network having only two signals in which to transmit a first cache operation information between a first set of cache agents and a first protocol agent and between a second set of cache agents and a second protocol agent respectively, the microprocessor further including a second network having only two signals in which to transmit a second cache operation information between the first set of cache agents and the first protocol agent and between the second set of cache agents and the second protocol agent, respectively, within the same clock cycle as the first cache operation information, wherein the first cache operation information includes snoop data, write-back information, and data request commands and the second cache operation information includes fill acknowledge information and non-data snoop response information;
a memory coupled to the microprocessor.

10. The system of claim 9 wherein the first network comprises a first routing circuit to route a first signal in a first direction from any of the first or second set of cache agents to the first or second protocol agent, respectively, and to route a second signal in a second direction from any of the first or second set of cache agents to the first or second protocol agent, respectively.

11. The system of claim 10 wherein the second network comprises a second routing circuit to route a third signal in the first direction from any of the first or second set of cache agents to the first or second protocol agent, and to route a fourth signal in the second direction from any of the first or second set of cache agents to the first or second protocol agent.

12. The system of claim 11 wherein the first network is to transmit the first signal in a first direction during the same clock cycle as the second signal in a second direction.

13. The system of claim 12 wherein the first and second protocol agents each comprise a first buffer to store information contained within the first signal and a second buffer to store information contained within the fourth signal during the same clock cycle.

14. The system of claim 13 wherein the second network is to transmit the third signal in a first direction during the same clock cycle as the fourth signal in a second direction.

15. The system of claim 14 wherein the first and second protocol agents each comprise a first buffer to store information contained within the third signal and a second buffer to store information contained within the second signal during the same clock cycle.

16. The system of claim 15 wherein the first and second protocol agents each comprise:
a first multiplexer (MUX) to select the first signal during the first clock cycle, and to select the second signal during the second clock cycle;
a second multiplexer (MUX) to select the third signal during the first clock cycle, and to select the fourth signal during the second clock cycle.

17. The system of claim 16 wherein the first and second protocol agents comprise switching logic to store the first and third signal to a first buffer during the first clock cycle and the second and fourth signal to a second buffer during the second clock cycle.

18. An processor comprising:
a ring network of cache agents, a first set of the cache agents to communicate via a first protocol agent and a second set of cache agents to communicate via a second protocol agent, the first and second protocol agents comprising a first and second first-in-first-out (FIFO) buffer to store a first information during a first clock cycle and a second information during a second clock cycle;
a plurality of routing agents to route the first information between the first set of cache agents and the first protocol agent using only two signal lines and the second information between the second set of cache agents and the second protocol agent using only two signal lines, respectively, wherein the first information includes snoop data, write-back information, and data request commands and the second information includes fill acknowledge information and non-data snoop response information.

19. The processor of claim 18 wherein the first clock cycle is an even numbered clock cycle and the second clock cycle is an odd numbered clock cycle.

20. The processor of claim 18 wherein the first protocol agent is to store information from the first set of cache agents in the first FIFO buffer and information from the second set of cache agents in the second FIFO buffer during the same clock cycle.

21. The processor of claim 18 wherein the second protocol agent is to store information from the first set of cache agents in the first FIFO buffer and information from the second set of cache agents in the second FIFO buffer during the same clock cycle.

22. The processor of claim 18 wherein the ring network comprises an interconnect to transmit the first information between the first set of cache agents and the first protocol agent and the second information between the second set of cache agents and the second protocol agent.

23. The processor of claim 18 wherein the first and second protocol agents are an even number of hops apart on the ring network.

24. A method comprising:
transmitting a first cache operation through a communication channel, having only two signals, in a first direction;
transmitting a second cache operation through a communication channel, having only two signals, in a second direction during the same clock cycle as transmitting the first cache operation on the first direction, wherein the first cache operation includes snoop data, write-back information, and data request commands and the second cache operation includes fill acknowledge information and non-data snoop response information.

25. The method of claim 24 further comprising storing an indication of a first cache operation comprising a first type of information in a first buffer.

26. The method of claim 25 further comprising storing an indication of a second cache operation comprising a second type of information in a second buffer during the same clock cycle as storing the first cache operation in the first buffer.

* * * * *